(12) United States Patent
Street et al.

(10) Patent No.: US 9,103,450 B2
(45) Date of Patent: Aug. 11, 2015

(54) EMERGENCY CONTROL GAS BALL VALVE

(71) Applicants: Alan Street, Tamworth (GB); Mark Jones, Walsall (GB); Mark Wynne, Shirley (GB); Ian Fellows, Walsall (GB)

(72) Inventors: Alan Street, Tamworth (GB); Mark Jones, Walsall (GB); Mark Wynne, Shirley (GB); Ian Fellows, Walsall (GB)

(73) Assignee: CERRO E.M.S., Birmingham (GB)

( * ) Notice: Subject to any disclaimer, the term of this patent is extended or adjusted under 35 U.S.C. 154(b) by 10 days.

(21) Appl. No.: 13/765,123

(22) Filed: Feb. 12, 2013

(65) Prior Publication Data

US 2014/0021394 A1    Jan. 23, 2014

Related U.S. Application Data

(60) Provisional application No. 61/620,766, filed on Apr. 5, 2012.

(51) Int. Cl.
*F16K 5/06* (2006.01)
*F16K 27/06* (2006.01)

(52) U.S. Cl.
CPC ............. *F16K 5/0657* (2013.01); *F16K 27/067* (2013.01); *F16K 5/06* (2013.01); *Y10T 137/0402* (2013.01)

(58) Field of Classification Search
CPC ....... F16K 5/06; F16K 5/0657; F16K 27/067; Y10T 137/0402

USPC ............... 251/315.01, 315.1, 315.03–315.06, 251/214, 356, 366–368; 137/15.01, 15.22, 137/315.18

See application file for complete search history.

(56) References Cited

U.S. PATENT DOCUMENTS 5,201,493 A * 4/1993 Kim .......................... 251/315.05
2003/0098652 A1 * 5/2003 Beech et al. ................. 313/634

FOREIGN PATENT DOCUMENTS

| DE | 3417103 | * 11/1985 | |
| DE | 3519273 | 12/1986 | |
| DE | 3618321 A1 * | 12/1987 | ................ F16K 5/06 |
| DE | 19904062 | 3/2000 | |
| WO | WO 93/18323 | 9/1993 | |

OTHER PUBLICATIONS

English language abstract of DE 19904061 published on Mar. 8, 2000.
English language abstract of EP 0209647, which is a counterpart of DE 35 19 273 published on Dec. 4, 1986.

* cited by examiner

*Primary Examiner* — Marina Tietjen
(74) *Attorney, Agent, or Firm* — DLA Piper LLP (US); R. Blake Johnston

(57) ABSTRACT

An electrically insulating valve includes a body housing a valve mechanism. The body has first and second openings in communication with the valve mechanism. The body is adapted to attach to a first pipe so that the first opening is in communication with the first pipe. An electrically insulating insert having a passage there through is connected to the body so that the passage is in communication with the second opening. The electrically insulating insert is also adapted to be attached to a second pipe.

20 Claims, 11 Drawing Sheets

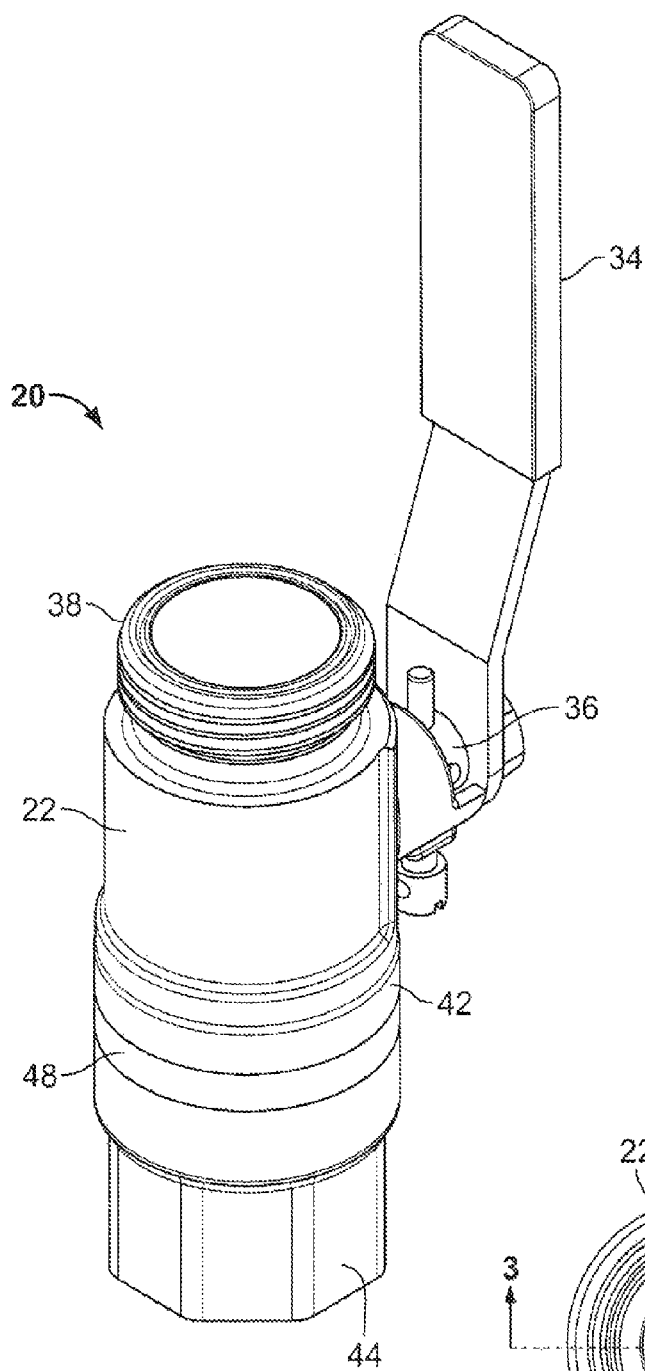
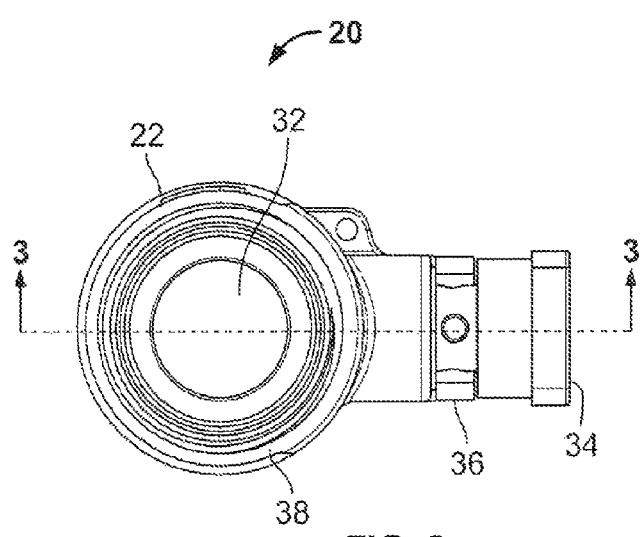
FIG. 1
FIG. 2

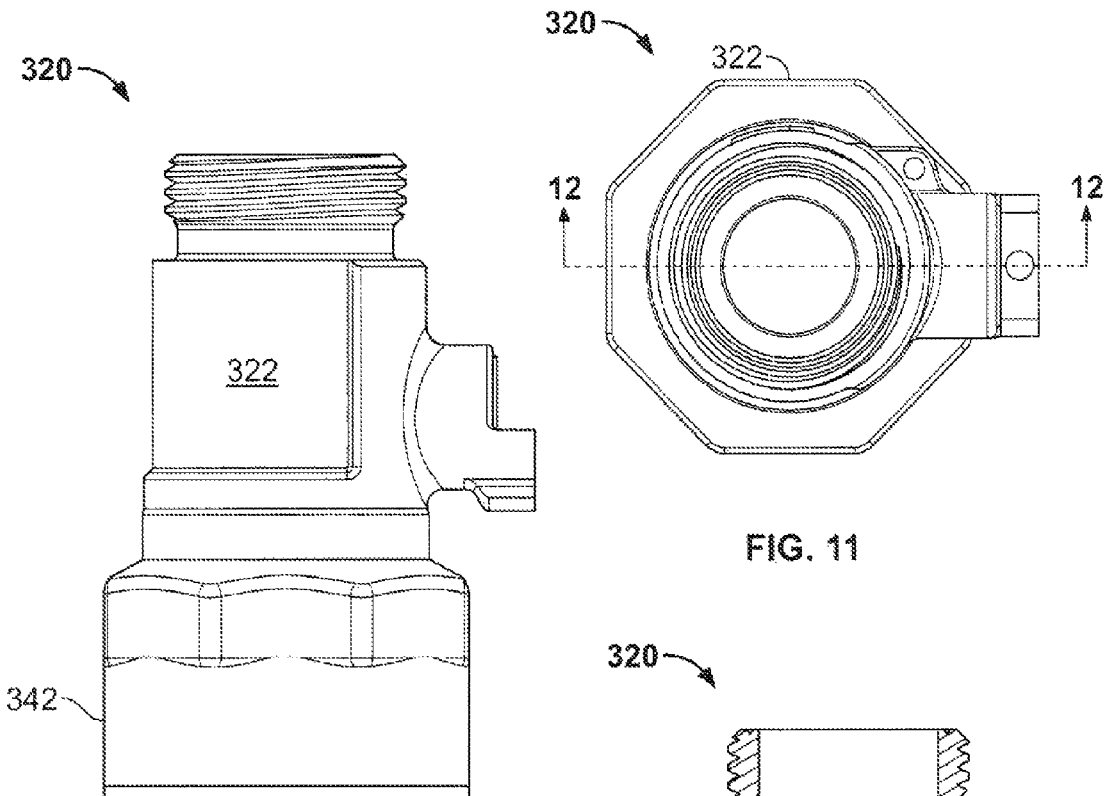
FIG. 10
FIG. 11
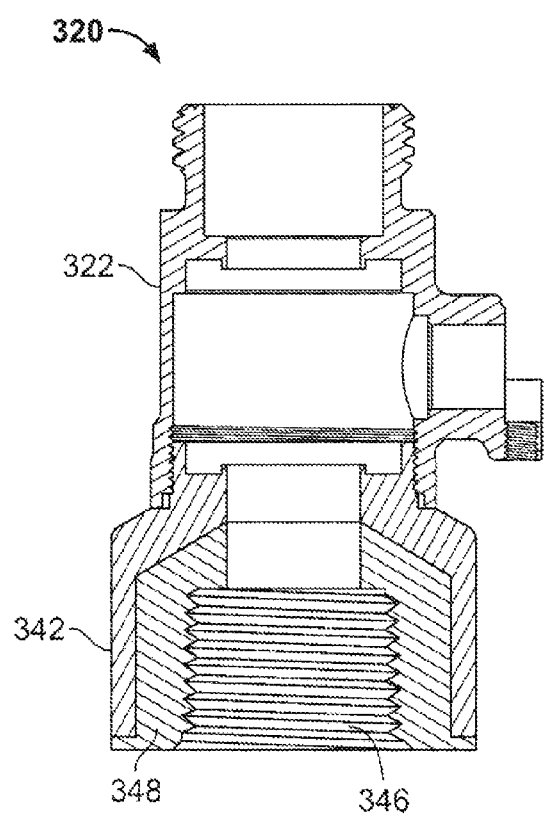
FIG. 12

US 9,103,450 B2

EMERGENCY CONTROL GAS BALL VALVE

CLAIM OF PRIORITY

This application claims priority to U.S. Provisional Patent Application No. 61/620,766, filed Apr. 5, 2012, the contents of which are hereby incorporated by reference.

FIELD OF THE INVENTION

The present invention relates generally to ball valves and, in particular, to an electrically insulating ball valve.

BACKGROUND

Ball valves are commonly used in many industries to control the flow of fluid/gas. This is because they offer short switching times, low torque requirements to opening and closing and air tight construction.

An example of an industry where ball valves are used is the gas industry. More specifically, gas is delivered from a processing, facility through a piping system that features a network of pipes to distribute the gas to use points located on a number of properties. Emergency gas control hall valves are positioned in each pipe that supplies gas to a property to provide a way to stop the flow of gas to the property in the event of an emergency, such as a fire on the property.

Gas companies typically have a responsibility to ensure that any gas pipe supplying gas to a property is electrically insulated from the pipe on the property receiving the gas. This is to protect the property in the event that the supply pipe becomes electrically "live" (i.e. has electrical current flowing through the metallic pipe walls) for some reason. Also, vice-versa, if the gas pipes on a property become live, the insulation prevents current from traveling back through the supply pipes and into the supply pipe system network.

A prior art approach to insulating gas supply pipes from gas receiving pipes on a property is to install an insulating coupler in the gas supply pipe leading to the property. Due to human error, however, such insulating couplers may not be installed. This results in risks to the property, gas supplier and safety of the gas customer.

Since the majority of pipes supplying gas to a property have an emergency gas control ball valve, the above insulation requirement would automatically be achieved if such a valve provided an electrical insulation function. A need therefore exists for a ball valve which has electrically insulating properties so as to remove the need to install an additional insulating coupler and thus the associated risk of human error.

BRIEF DESCRIPTION OF THE DRAWINGS

FIG. 1 is perspective view of a first embodiment of the gas control ball valve of the present invention prior to installation in a gas line;

FIG. 2 is a top plan view of the ball valve of FIG. 1;

FIG. 10 is side devotional view of a fourth embodiment of the gas control hail valve of the present invention prior to installation in a gas line;

FIG. 11 is atop plan view of the ball valve of FIG. 10;

FIG. 12 is a sectional view of the ball valve of FIGS. 10 and 11 taken along line 12-12 of FIG. 11;

DETAILED DESCRIPTION OF EMBODIMENTS

Figures 3, 4:
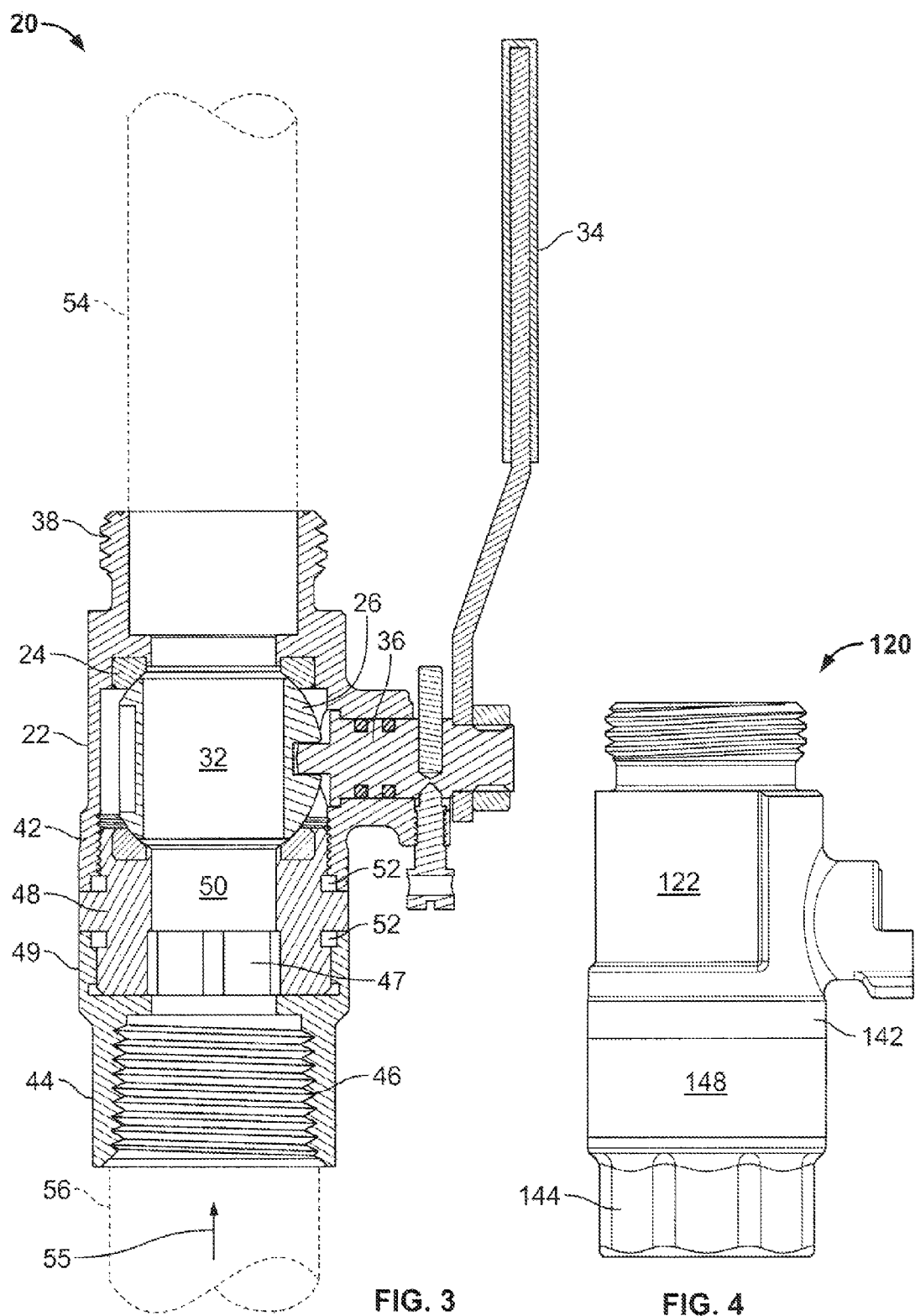
FIG. 3 is a sectional view of the ball valve of FIGS. 1 and 2 taken along line 3-3 of FIG. 2 and illustrating installation of gas supply and property pipes.
FIG. 4 is side devotional view of a second embodiment of the gas control ball valve of the present invention prior to installation in a gas line.

A first embodiment of the ball valve of the present invention is indicated in general at 20 in FIGS. 1-3. While the invention is described below in terms of an emergency gas control ball valve, it is to be understood that the process and apparatus of the invention may be incorporated into any ball valve used in any industry.

As is known in the art, the ball valve 20 has a body 22, which houses the valve mechanism or mechanical parts of the valve. More specifically, the body contains a valve seat 24 within which a ball 26 is seated and turns. The ball 26 includes a central passage 32 and is attached to a handle 34 by a spindle 36 so that the handle and the ball pivot simultaneously with respect to the body 22 when the handled is pivoted. The body features a top opening on the fluid/gas outlet side surrounded by a threaded annular portion 38 to which the property pipe work is connected. The bottom (fluid/gas inlet side) of the body features an opening surrounded by skirt portion 42.

On the fluid/gas inlet side of the body, an end cap or nut 44 is fixed. The end cap features a threaded bore 46 to which the supply pipe work may be connected. The upper portion of the end cap includes a cylindrical plug portion 47 and a cylindrical collar portion 49. An annular groove is defined between the outer wall surface of the plug portion 47 and the inner wall surface of the collar portion 49.

The ball valve body 22 and end cap 44 are preferably constructed of brass, but may be constructed from other materials. It should be noted that alternatively the supply pipe work could be connected to threaded annular portion 38 and the property pipe work could be connected to threaded bore 46 in the embodiments of FIGS. 1-3 (and all other embodiments described below).

Electrical insulation between a supply system pipe and a property pipe is provided by the addition of an insert 48 (or inserts), which fits in between the body 22 and the end cap 44. More specifically, as illustrated in FIG. 3, the top portion of the insert 48 is received within the skirt portion 42 of the valve body 22 while the bottom portion of the insert is received within the annular groove of the end cap 44. The insert is preferably held in place in an interference fit fashion, but may alternatively, or in addition, be held in place by adhesive or other fastening means known in the art. As illustrated in FIG. 3, the insert 48 includes a central passage 50 that is in fluid communication with the threaded bore 46 of the end cap 44, via the opening through end cap plug portion 47, and selectively (depending on the position of valve handle 34) with the central passage 32 of the ball valve ball 26.

The insert 48 is made from an electrically insulating material that is preferably also fireproof, fire resistant or provided with a fire resistant coating in the event that the ball valve is exposed to a fire. Suitable insert materials include, but are not limited to, plastic with a fire resistant coating, ceramics, epoxy, fiber glass and resins.

As indicated at 52 in FIG. 3, annular recesses may be formed in the skirt portion 42 of the valve body 22, the inner surface of collar portion 49 and corresponding portions of the insert 48 so that O-ring seals 52 may be included.

As illustrated in FIG. 3, the ball valve 20 is interposed between two pipes, indicated in phantom at 54 and 56, to couple them together and enable control of the flow of gas passing through the two pipes via positioning of the ball 26 via handle 34. Pipe 56 represents the supply pipe work that supplies gas to a property (as indicated by arrow 55) while pipe 54 represents the property pipe work. When the handle 34 is positioned in a same direction as the longitudinal directions of the two pipes, as illustrated in FIGS. 1-3, the central passage 32 of the ball valve is aligned with the passages of the pipes 54 and 56 so that the ball valve is open. When the handle is positioned in a direction perpendicular to the two pipes, the central passage of the ball is oriented perpendicular to the passages of the pipes and the ball valve is closed.

Alternative embodiments of the ball valve of the present invention are presented in FIGS. 4-23. Each of these embodiments use an insert that may be constructed of the same materials including, but not limited to, those presented above for insert 48 of FIGS. 1-3. The handle, spindle, ball seat and ball have been omitted from FIGS. 4-12 for clarity. Each hail valve in FIGS. 4-23 is connected between gas supply and property pipes in the manner illustrated in FIG. 3 or in a similar manner.

Figure 5:
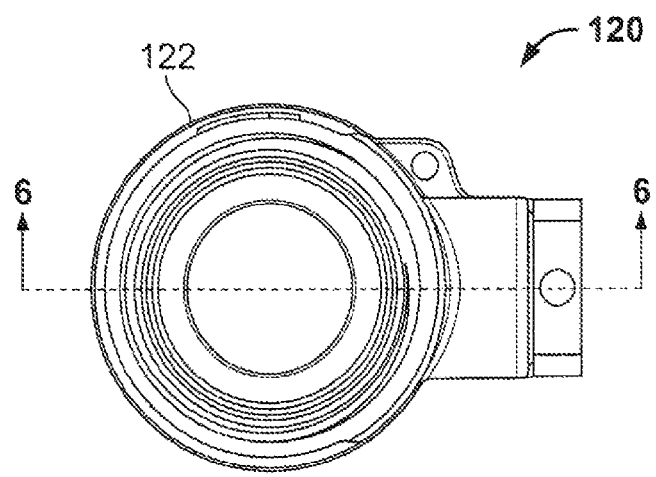
FIG. 5 is a top plan view of the ball valve of FIG. 4.
Figure 6:
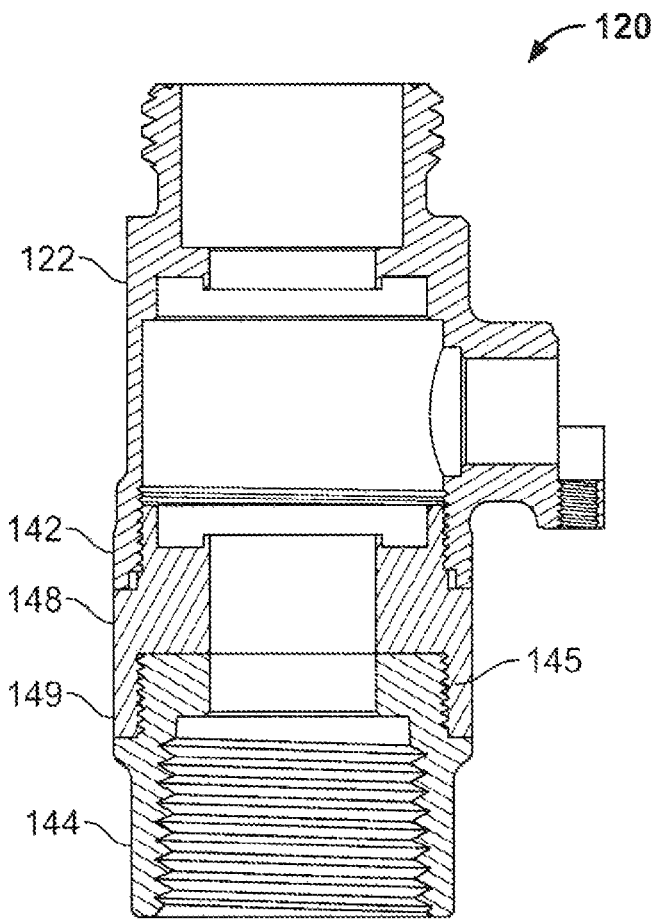
FIG. 6 is a sectional view of the ball valve of FIGS. 4 and 5 taken along line 6-6 of FIG. 5.

In FIGS. 4-6, a second embodiment of the ball valve of the present invention is indicated in general at 120. The valve features a body 122 that, similar to the embodiment of FIGS. 1-3, includes a skirt portion 142. In this embodiment, however, the top portion of end cap 144 is provided with circumferential, external threads 145. The electrically insulating and fireproof or fire resistant insert 148 features a bottom skirt portion 149 that includes a threaded bore with threads that mate with the external threads 145 of the end cap. The top portion of the insert 148 is secured within the skirt portion 142 of the valve body 122 preferably in an interference fit fashion and/or with the use of adhesive.

Figure 7:
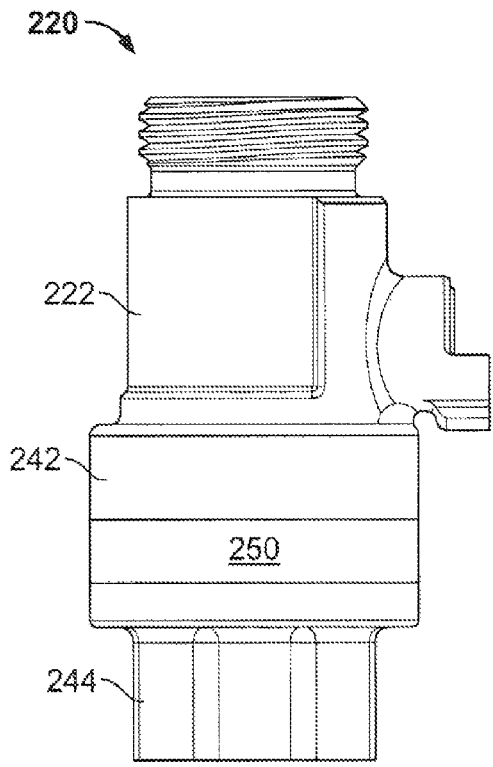
FIG. 7 is side elevational view of a third embodiment of the gas control ball valve of the present invention prior to installation in a gas line.
Figure 8:
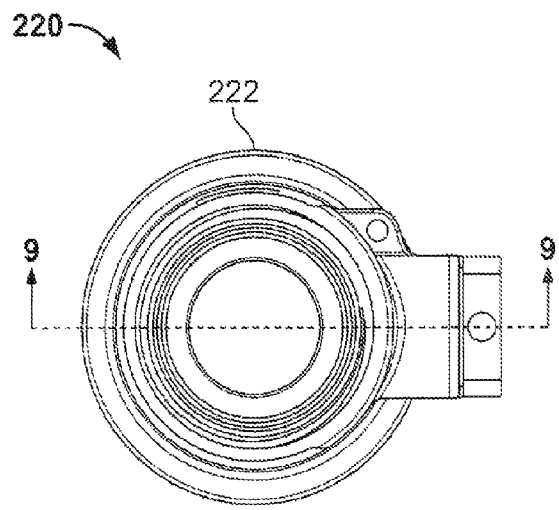
FIG. 8 is a top plan view of the ball valve of FIG. 7.
Figure 9:
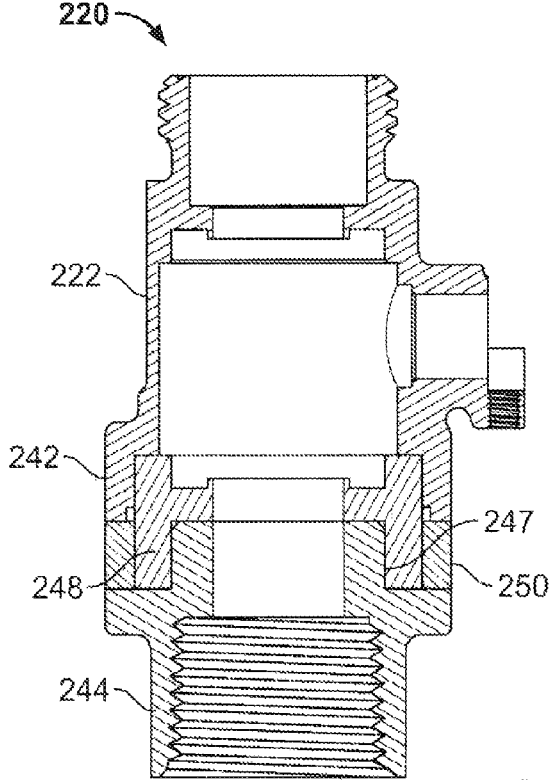
FIG. 9 is a sectional view of the ball valve of FIGS. 7 and 8 taken along line 9-9 of FIG. 8.

In FIGS. 7-9, a third embodiment of the ball valve of the present invention is indicated in general at 220. The valve features a body 222 that, similar to the embodiments of FIGS. 1-3 and 4-6, includes a skirt portion 242 which receives the upper portion of an electrically insulating and fireproof or fire resistant insert 248, preferably in an interference fit fashion and/or with the use of adhesive. As illustrated in FIG. 9, the upper portion of end cap 244, however, features a cylindrical plug portion 247 which engages an annular recess formed in the bottom portion of insert 248, preferably in art interference fit fashion and/or with the use of adhesive. The insert 248 is sized so that art annular groove is formed between the valve body 222 and end cap 244. A ring 250 of fireproof or fire resistant material is positioned with the annular groove. The insert 248 may also be constructed of fireproof or fire resistant material. The ring 250 preferably includes a split so that it may be easily installed and removed from the ball valve 220.

In FIGS. 10-12, a fourth embodiment of the ball valve of the present invention is indicated in general at 320. The valve features a body 322 that includes a skirt portion 342 which, in contrast to the above embodiments, receives the entirety of an electrically insulating and fireproof or fire resistant insert 348, preferably in an interference fit fashion and/or with the use of adhesive. The insert 348 includes a threaded bore 346 to which the supply pipe work may be connected.

Figure 13:
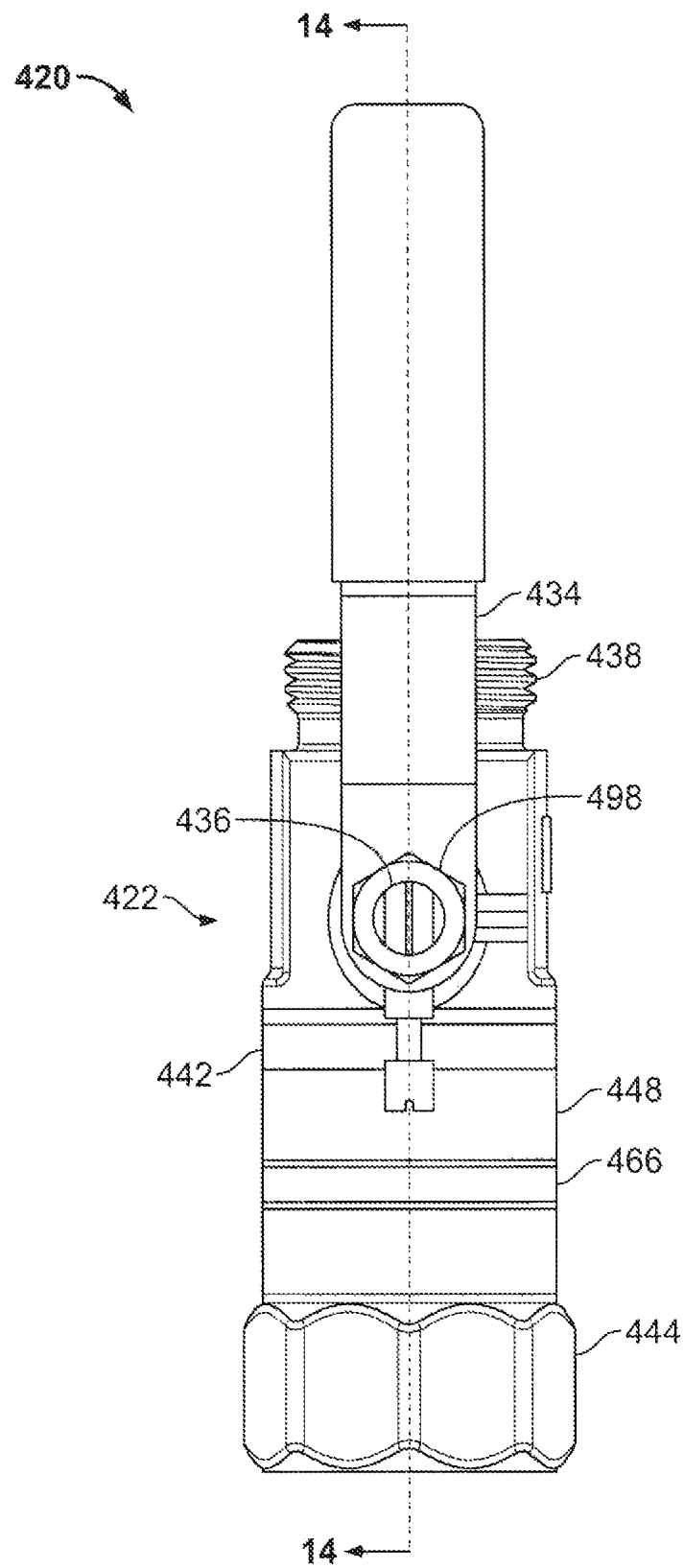
FIG. 13 is side elevational view of a fifth embodiment of the gas control ball valve of the present invention prior to installation in a gas line.
Figure 14:
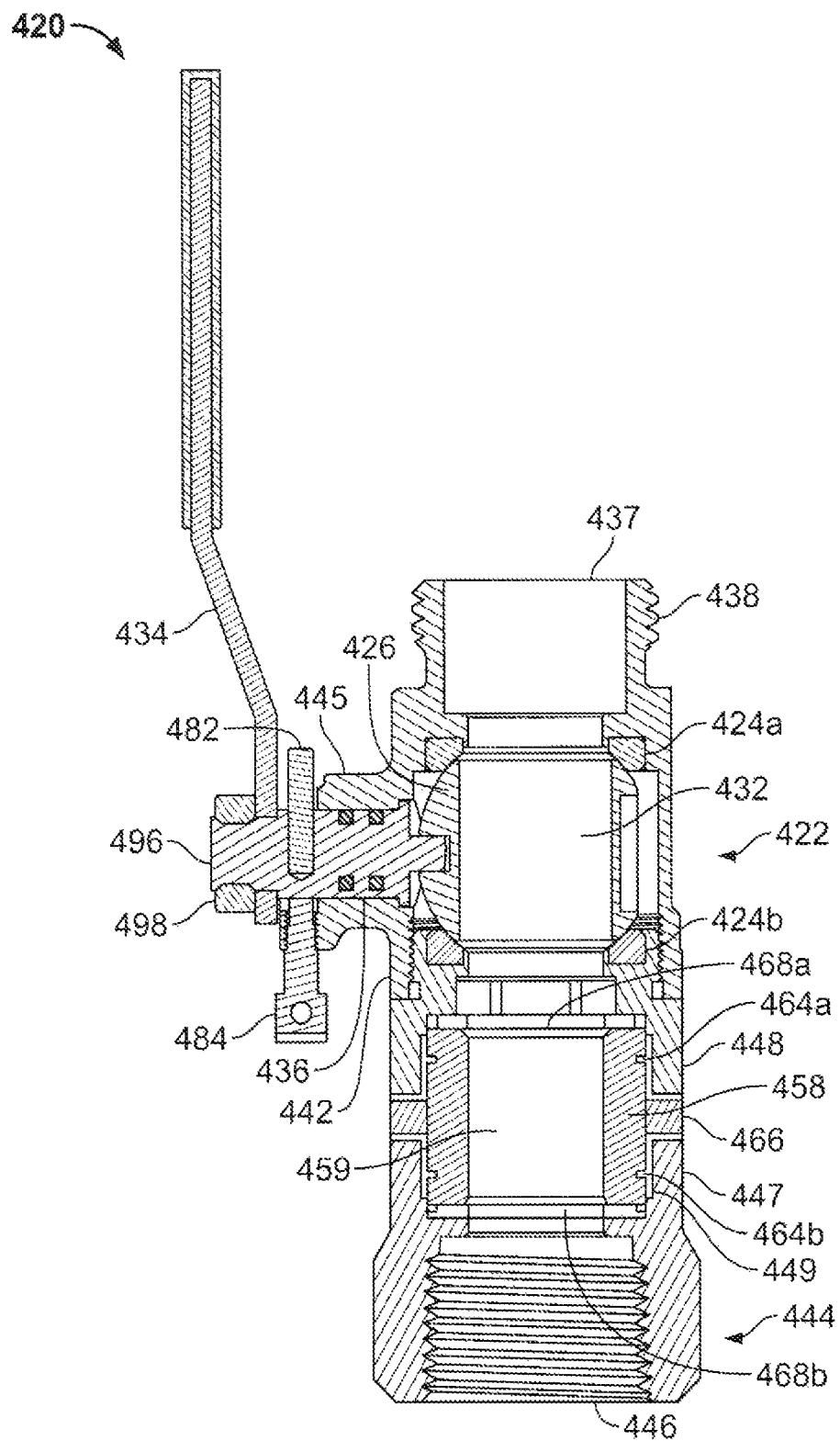
FIG. 14 is a sectional view of the ball valve of FIG. 13 taken along line 14-14 of FIG. 13.
Figure 15:
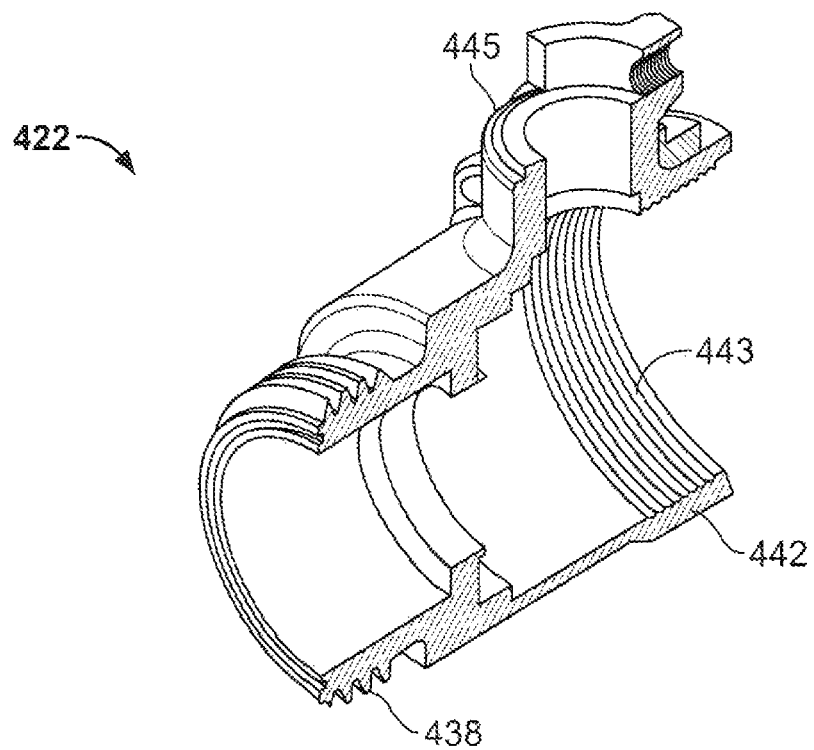
FIG. 15 is an enlarged perspective sectional view of the body of the ball valve of FIG. 14.

A fifth embodiment of the ball valve of the present invention is indicated in general at 420 in FIGS. 13-14. As is known in the art, the ball valve 420 has a body 422, which houses the valve mechanism or mechanical parts of the valve. More specifically, with reference to FIG. 14, the body contains a valve seat, formed by seal rings 424a and 424b within which a ball 426 (also indicated in general at 426 in FIG. 22) is seated and turns. Seal rings 424a and 424b are preferably constructed from polytetrafluoroethylene (PTFE), such as FE 500, although other materials known in the an for seal rings may alternatively be used. The ball 426 includes a central passage 432 and is attached to a handle 434 by a spindle 436 so that the handle and the ball pivot simultaneously with respect to the body 422 when the handled is pivoted. The body features a top opening 437 on the fluid/gas outlet side surrounded by a threaded annular portion 438 (also illustrated in FIG. 15 to which the property (or alternatively, the supply) pipe work is connected. As is known in the art, the ball is pivoted via the handle so that the central passage 432 is in alignment with the top opening 437 to place the ball valve in the open configuration (illustrated in FIGS. 13 and 14). The handle is pivoted to move the central passage 432 out of assignment with the top opening 437 to place the ball valve in the closed configuration. The bottom (fluid/gas inlet side) of the body features an opening surrounded by skirt portion 442 that defines a passage surrounded by internal threads, illustrated at 443 in FIG. 15. As illustrated in FIGS. 14 and 15, the body 422 also includes a spindle housing 445 within which the spindle is supported in a rotating fashion.

Figure 16:
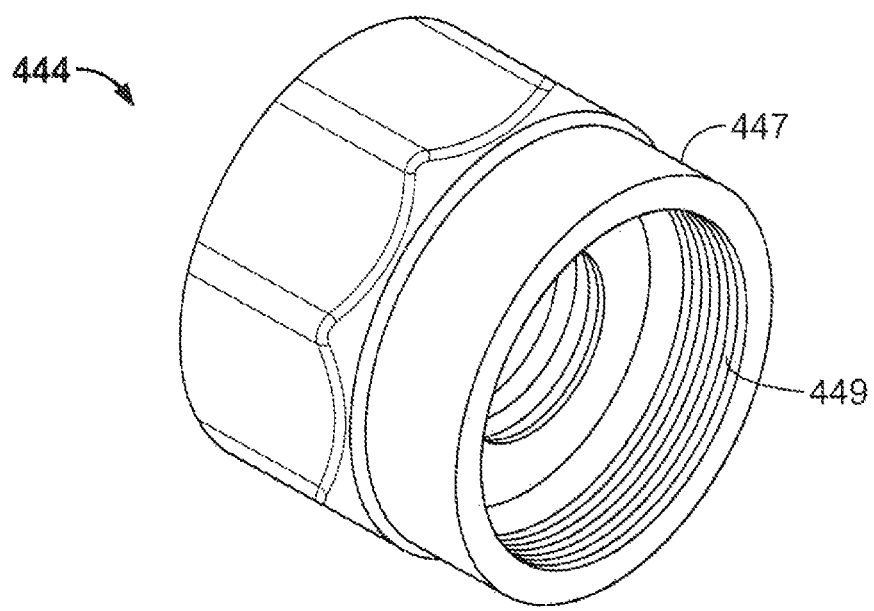
FIG. 16 is an enlarged perspective view of the end cap of the ball valve of FIG. 14.

On the fluid/gas inlet side of the ball valve, an end cap 444 is fixed. As illustrated in FIG. 14. The end cap features a threaded bore 446 to which the supply (or alternatively, the property) pipe work may be connected. As illustrated in FIGS. 14 and 16, the upper portion of the end cap includes a cylindrical portion 447, also having a threaded bore 449. Threaded bores 446 and 449 are in communication with one another to form a passage through the end cap.

Figure 17:
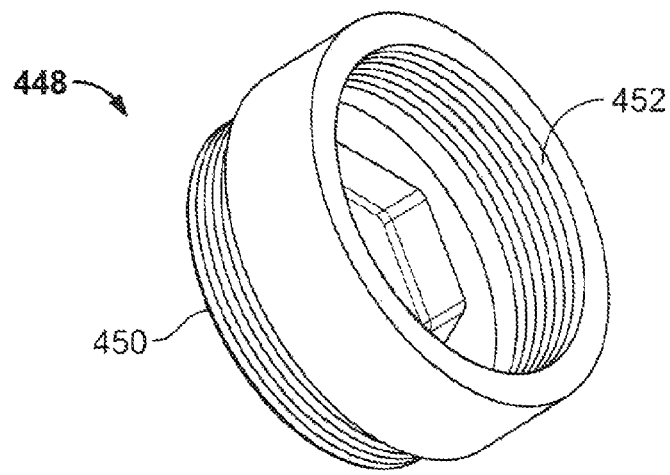
FIG. 17 is an enlarged perspective view of the compression ring of the ball valve of FIG. 14.

As illustrated in FIGS. 13 and 14, a compression ring 448 engages the skirt portion 442 of the valve body 422. More specifically, as illustrated in FIG. 17, the compression ring 448 features an external threaded collar portion 450 having a passage there through and an internal threaded bore 452 so that a passage is formed through the compression ring. As illustrated in FIG. 14, the external threaded collar portion of the compression ring engages the internal threads (443 of FIG. 15) of the skirt portion 442 the valve body.

The ball valve body 422, compression ring 448 and end cap 444 are all preferably constructed of brass, but may be constructed from other materials known in the art.

With reference to FIG. 14, electrical insulation between a supply system pipe and a property pipe is provided by the addition of an electrical insulation insert 458, which fits in between the compression ring 448 and the end cap 444. More specifically, as illustrated in FIG. 14, the top end portion of the insert 458 is received within the threaded bore (452 of FIG. 17) of the compression ring 448, while the bottom end portion of the insert 458 is received within the threaded bore 449 (FIG. 16) of the end cap 444.

Figure 18:
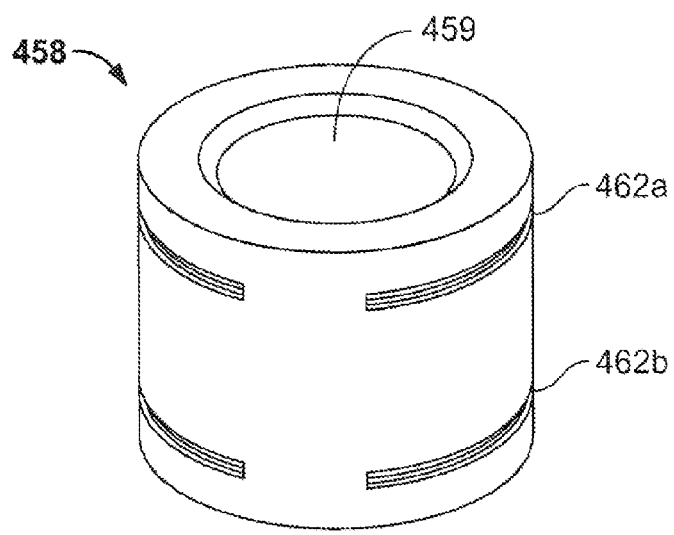
FIG. 18 is an enlarged perspective view of the insulation insert of the hall valve of FIG. 14.

As illustrated in FIGS. 14 and 18, the electrically insulating insert 458 is cylindrical in shape and includes a central passage 459 that is in fluid communication with the threaded bore 446 (FIG. 14) of the end cap 444, the passage of the compression ring 448 and selectively (depending on the position of valve handle 434) with the central passage 432 of the ball valve ball 426.

The insert 458 is made from an electrically insulating material that is preferably also fireproof, fire resistant or provided with a fire resistant coating in the event that the ball valve is exposed to a fire. The electrically insulating insert 458 is preferably made from alumina 997, but other suitable insert materials include, but are not limited to, plastic with a fire resistant coating, ceramics, epoxy, fiber glass and resins.

Figure 19:
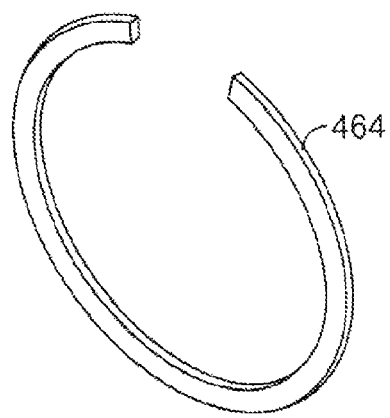
FIG. 19 is an enlarged perspective view of a retaining ring of the ball valve of FIG. 14.
Figure 20:
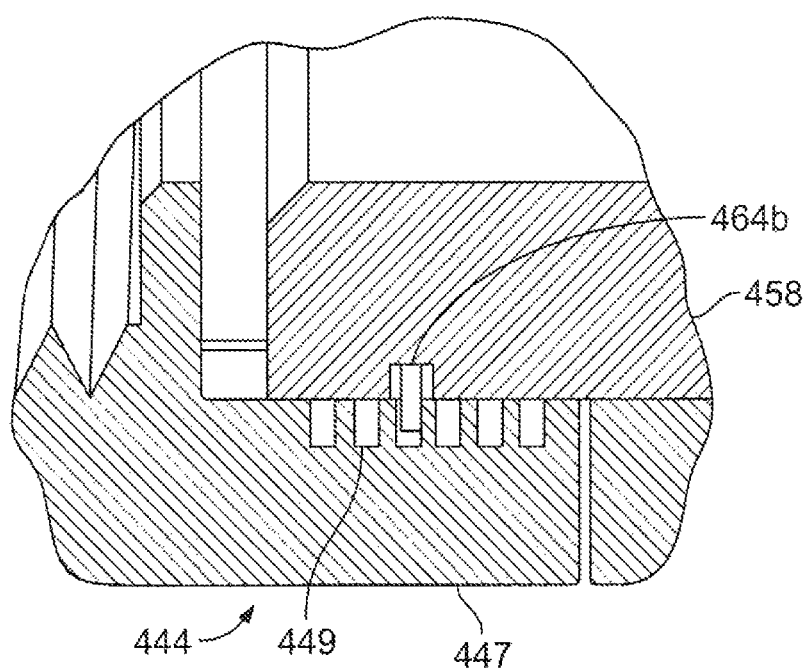
FIG. 20 is an enlarged partial sectional view of a portion of the end cap, spacer band, insulating insert and retaining ring of the ball valve of FIG. 14.

The insert is preferably held in place within the compression ring and the end cap using a retaining, ring arrangement. More specifically, as illustrated in FIG. 18, the electrically insulating insert is provided with retaining ring grooves 462a and 462b. The retaining ring grooves travel the majority of the way around the circumference of the exterior surface of the insert and are sized to receive a C-shaped retaining ring, such as retaining ring 464 of FIG. 19. The retaining ring is preferably constructed from 302 stainless steel, but other materials known in the art for retaining rings may alternatively be used. With reference to FIGS. 18 and 19. When the electrically insulating insert 458 installed, a retaining ring 464 is placed one each in each groove 462a and 462b. With reference to FIG. 14, retaining ring 464a engages the threads of threaded bore 452 (FIG. 17) of the compression ring 448, while, with reference to FIGS. 14 and 20, retaining ring 464b engages the threads of threaded bore 449 of the end cap 444.

With reference to FIG. 14, the electrically insulating insert 458 is sized so that an annular groove is formed between the compression ring 448 and end cap 444 when the insert is installed. A ring-shaped spacer band 466 (FIGS. 13 and 14) made of rubber (having, for example, a 50/60 SH) or some other electrically insulating material, is positioned within the annular groove. In addition, a pair of washer-shaped fire resistant spacers, indicated at 468a and 468b in FIG. 14, are positioned between the top end of the electrically insulating insert 458 and the compression ring 448 and between the bottom end of the electrically insulating insert 458 and the end cap 444, respectively. The fire resistant spacers 468a and 468b are preferably made of an aramid fiber based gasket material, such as KLINGERferroflex SP-AF/II, available from Klinger Ltd. of the UK, but alternative fire resistant or fireproof materials may be used.

Figure 21:
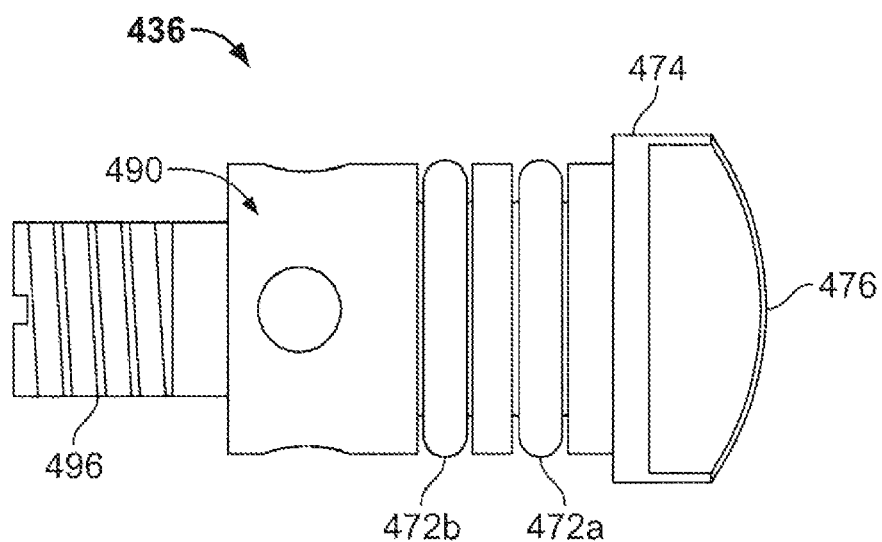
FIG. 21 is an enlarged side elevational view of the spindle and O-rings of the ball valve of FIG. 14.
Figure 22:
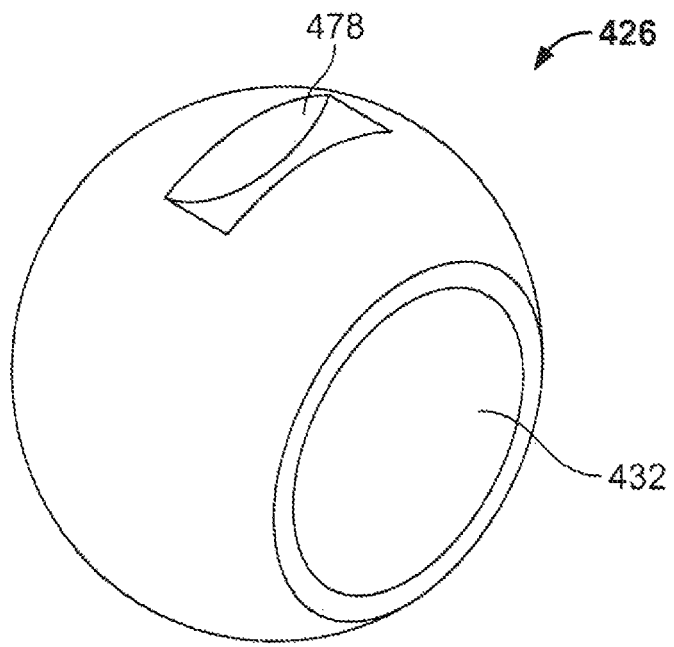
FIG. 22 is an enlarged perspective view of the ball of the ball valve of FIG. 14.
Figure 23:
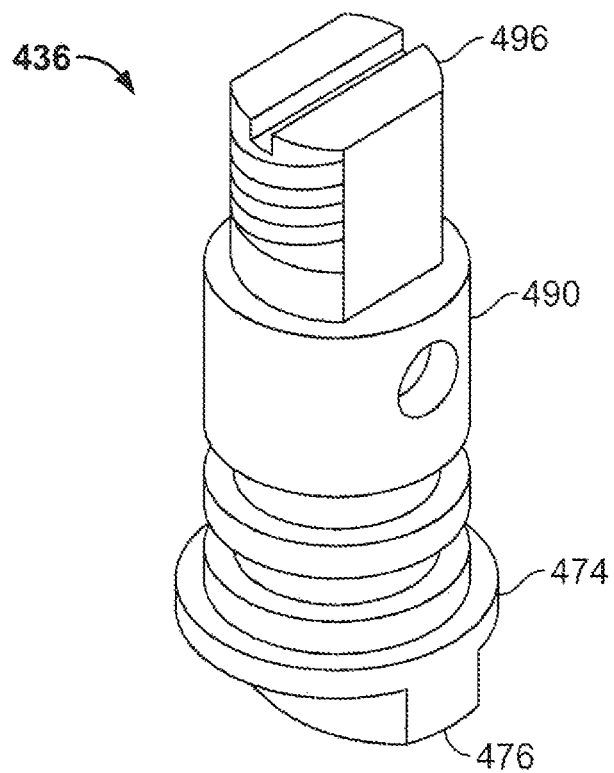
FIG. 23 is an enlarged perspective view of the spindle of the ball valve of FIG. 14.

Enlarged views of the spindle used to attach the valve handle 434 (FIGS. 13 and 14) to the ball 426 (FIGS. 14 and 22) are provided in FIGS. 21 and 23, where the spindle is indicated in general at 436. As indicated in FIG. 21, the spindle includes a pair of circumferential recesses that receive O-rings 472a and 472b. O-ring 472a is preferably constructed from nitrile rubber while O-ring 472b is preferably constructed, from a of synthetic rubber and fluoropolymer elastomer, such as VITON, available from DuPont Performance Elastomers L.L.C. of Wilmington, Del. Alternative materials known in the an may be used for the O-rings. As illustrated in FIG. 14, the O-rings engage the inner surface of the spindle housing 445 (also shown in FIG. 15) so as to form a seal, yet still permit the spindle to rotate within the spindle housing when the handle is turned.

As illustrated in FIGS. 21 and 23. The proximal end of the spindle features a collar portion 474 upon which is positioned a tab 476. The tab is sized to engage, with reference to FIG. 22, a notch 478 formed in the top of the ball 426, so that when the spindle is turned via the handle, the ball turns so as to open or close the valve.

As illustrated in FIG. 14, the spindle is secured within the spindle housing 445 via the collar 474 (FIGS. 21 and 23) and a pin and a screw, illustrated at 482 and 484, respectively, in FIG. 14, which engage openings formed in a middle portion of the spindle, indicated at 490 in FIGS. 21 and 23. The distal portion of the spindle includes a threaded portion 496 having having a pair of flat surfaces which engage an opening having a corresponding shape in handle 434 (FIGS. 13 and 14). As illustrated in FIG. 14, the handle is secured to the threaded portion 496 with nut 498.

The invention may be applied to all versions of ball valves, which include, but are not restricted to, ¾"×¾", 1"×¾", 1×1 straight and right angle.

While the preferred embodiments of the invention have been shown and described, it will be apparent to those skilled in the art that changes and modifications may be made therein without departing from the spirit of the invention, the scope of which is defined by the appended claims.

What is claimed is:

1. An electrically insulating valve comprising:
   a. a body housing a valve mechanism, said body having first and second openings in communication with the valve mechanism and said body adapted to attach to a first pipe so that the first opening is in communication with the first pipe;
   b. an electrically insulating insert having a passage there through, said electrically insulating insert connected to the body so that the passage is in communication with the second opening;
   c. an end cap having an end cap passage there through, said end cap attached to said electrically insulating insert so that the end cap passage is in communication with the insert passage, said end cap adapted to be attached to a second pipe;
   d. a ring-shaped electrically insulating band positioned between the end cap and the body;
   e. a first fire-resistant spacer positioned between the electrically insulating insert and the valve body; and
   f. a second fire-resistant spacer positioned between the electrically insulating insert and the end cap.

2. The electrically insulating valve of claim 1 wherein the valve mechanism includes:
   i) a valve seat positioned within the body;
   ii) a ball having a ball passage there through positioned within said seat so as to be rotatable between an open position, where the ball passage is in communication with the first and second openings of the valve body, and a closed position, where the ball passage is not in communication with the first and second openings of the valve body;
   iii) a spindle connected to the ball and rotatably positioned within the body;
   iv) a handle connected to the spindle for rotating the ball between the open and closed positions.

3. The electrically insulating valve of claim 2 wherein the valve seat includes a pair of seal rings.

4. The electrically insulating valve of claim 3 wherein the pair of seal rings are constructed from polytetrafluoroethylene.

5. The electrically insulating valve of claim 2 wherein the valve body includes a spindle housing within which the spindle is rotatably positioned, and further comprising first and second O-rings positioned around the spindle and engaging an interior surface of the spindle housing.

6. The electrically insulating valve of claim 5 wherein the first O-ring is constructed from nitrile rubber and the second O-ring is constructed from a synthetic rubber and fluoropolymer elastomer.

7. The electrically insulating valve of claim 1 wherein the electrically insulating insert is constructed of alumina.

8. An electrically insulating valve comprising:
   a. a body housing a valve mechanism, said body having first and second openings in communication with the valve mechanism and said body adapted to attach to a first pipe so that the first opening is in communication with the first pipe;
   b. an electrically insulating insert having a passage there through;
   c. a compression ring having a compression ring passage, said compression ring passage connected to the valve body with the compression ring passage in communication with the second opening of the valve body, with said insulating insert connected to the compression ring so that the compression ring passage is in communication with the insert passage; and
   d. an end cap having an end cap passage there through, said end cap attached to said electrically insulating insert so that the end cap passage is in communication with the insert passage, said end cap adapted to be attached to a second pipe.

9. The electrically insulating valve of claim 8 further comprising a ring-shaped electrically insulating band positioned between the end cap and the body.

10. The electrically insulating valve of claim 9 further comprising a first fire-resistant spacer positioned between the electrically insulating insert and the valve body and a second fire-resistant spacer positioned between the electrically insulating insert and the end cap.

11. The electrically insulating valve of claim 10 wherein the first and second fire-resistant spacers are constructed from an aramid fiber based gasket material.

12. The electrically insulating valve of claim 8 wherein the compression ring includes a threaded compression ring bore and the end cap includes a threaded end cap bore with a first end portion of the electrically insulating insert featuring a first retaining ring and a second end portion of the electrically insulating insert featuring a second retaining ring, said first end of the electrically insulating insert positioned within the compression ring bore with the first retaining ring engaging threads of the compression ring bore and said second end of the electrically insulating insert positioned within the end cap bore with the second retaining ring engaging threads of the end cap bore.

13. The electrically insulating valve of claim 12 wherein the first and second retaining rings are generally C-shaped and made of stainless steel.

14. The electrically insulating valve of claim 8 further comprising a ring-shaped electrically insulating band positioned between the end cap and the compression ring.

15. The electrically insulating valve of claim 14 further comprising a first fire-resistant spacer positioned between the electrically insulating insert and the compression ring and a second fire-resistant spacer positioned between the electrically insulating insert and the end cap.

16. The electrically insulating valve of claim 15 wherein the first and second fire-resistant spacers are constructed from an aramid fiber based gasket material.

17. The electrically insulating valve of claim 8 wherein the valve mechanism includes:
   i) a valve seat positioned within the body;
   ii) a ball having a ball passage there through positioned within said seat so as to be rotatable between an open position, where the ball passage is in communication with the first and second openings of the valve body, and a closed position, where the ball passage is not in communication with the first and second openings of the valve body;
   iii) a spindle connected to the ball and rotatably positioned within the body;
   iv) a handle connected to the spindle for rotating the ball between the open and closed positions.

18. The electrically insulating valve of claim 17 wherein the valve seat includes a pair of seal rings.

19. The electrically insulating valve of claim 17 wherein the valve body includes a spindle housing within which the spindle is rotatably positioned, and further comprising first and second O-rings positioned around the spindle and engaging an interior surface of the spindle housing.

20. The electrically insulating valve of claim 8 wherein the electrically insulating insert is constructed of alumina.

* * * * *